Dec. 21, 1965  L. MUENNICH  3,224,144
FLORAL BASKET
Filed March 22, 1961
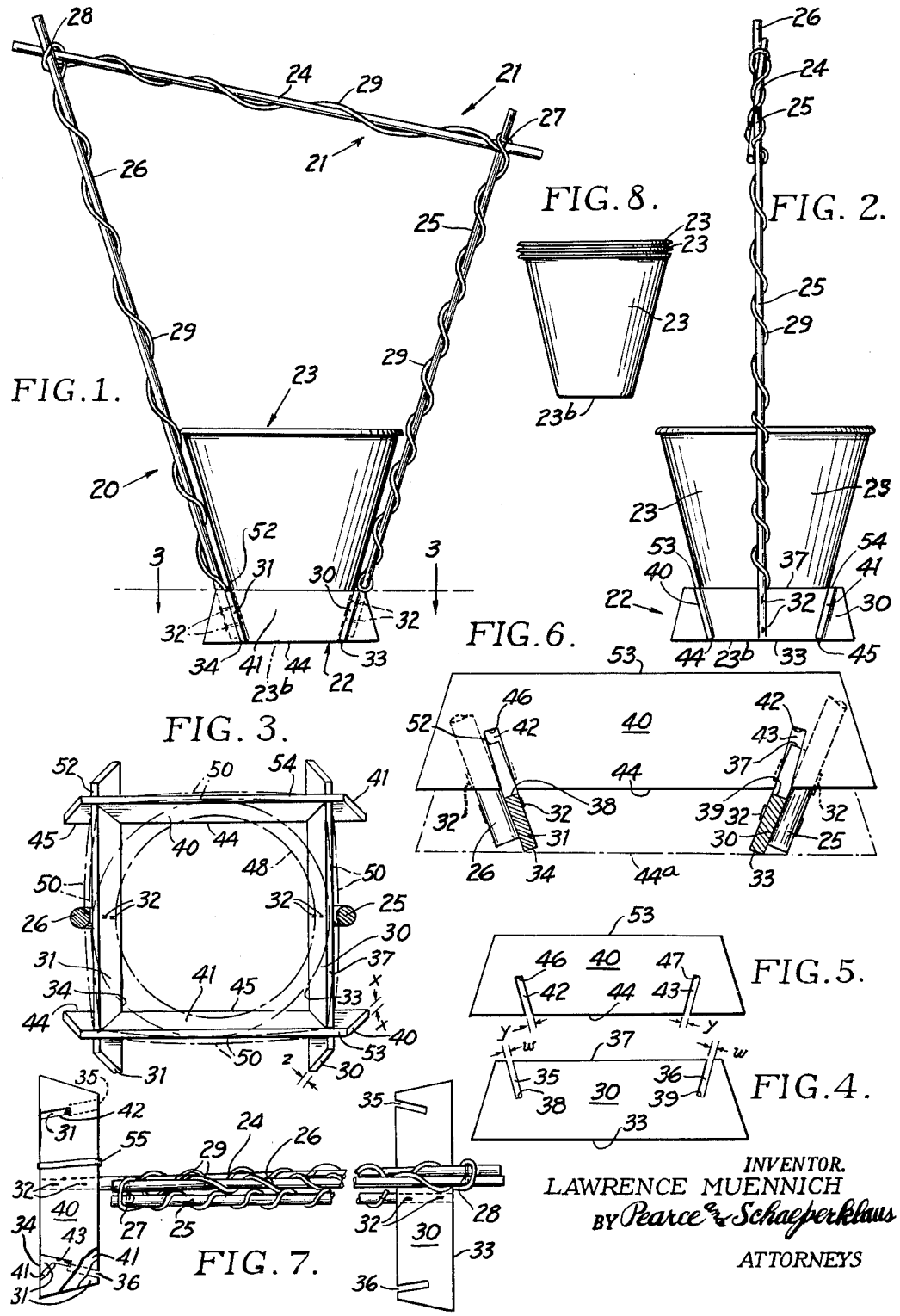
INVENTOR.
LAWRENCE MUENNICH
BY Pearce & Schaeperklaus
ATTORNEYS

United States Patent Office 3,224,144
Patented Dec. 21, 1965

3,224,144
FLORAL BASKET
Lawrence Muennich, Springfield Township, Hamilton County, Ohio (9850 Lakeview Drive, Cincinnati 31, Ohio)
Filed Mar. 22, 1961, Ser. No. 97,643
10 Claims. (Cl. 47—35)

This invention relates to floral baskets, and more particularly to floral baskets which require small space during shipment and storing when not in use.

An object of this invention is to provide a floral basket for holding an arrangement of flowers or the like.

Another object of this invention is to provide a floral basket of the above character which is strong and rigid.

Another object of this invention is to provide a floral basket of the above character, which may be folded and packed so as to occupy only a small space during shipment and storage when not in use.

Another object of this invention is to provide a floral basket of the above character, the parts of which cooperate to provide a stressed structure of rigid character.

Another object of this invention is to provide a floral basket of the above character, which may be easily assembled without using tools and in a very short time.

Another object of this invention is to provide a floral basket of the above character, which may be manufactured at costs competitive with conventional floral baskets.

Another object of this invention is to provide a floral basket of the above character, which may be shipped in compact condition at lower cost than conventional permanently pre-assembled, floral baskets and may be assembled without use of tools.

Another object of this invention is to provide a floral basket of the above character, comprising box sides in interlocking relation to box ends also stressed by a handle having riser portions secured to said box ends and interconnected by a spanning member spaced from said box ends, the box formed by said interlocking stressed box ends and sides being further stressed by a receptacle wedged in said box so as to bulge box sides and ends outwardly.

The above and other features and objects of this invention will in part be apparent and will in part be obvious to those having ordinary skill in the art to which this invention pertains from the following description and the accompanying drawings in which:

FIG. 1 is a view in front elevation of a floral basket which presently appears to be a preferred embodiment of my invention;

FIG. 2 is a view in side elevation of the floral basket illustrated in FIG. 1;

FIG. 3 is a view in horizontal section taken along 3—3 in FIG. 1, some portions being broken away and others being schematically shown to more clearly show details of construction;

FIG. 4 is a view of a box end forming part of the floral basket;

FIG. 5 is a view of a box side forming part of the floral basket;

FIG. 6 is a fragmentary view partly in section and partly broken away to more clearly show the cooperation of certain parts of the basket;

FIG. 7 is a plan view of the handle, box ends and sides of a basket in condition for storage or for packing for shipment, portions thereof being broken away for illustration; and FIG. 8 is a view of a plurality of receptacles nested for storage or for packing for shipment.

In the drawings and specifications like reference characters indicate like parts.

Floral baskets heretofore available in commerce are bulky and as a result expensive to ship. Shipping costs have tended to geographically limit the market area served by a given floral basket manufacturing establishment. In some areas, use of floral baskets is restricted by high cost resulting from shipping costs of substantial magnitude while other receptacles used in lieu thereof enjoy wider use in such areas. Floral baskets embodying my invention can be shipped to and stored at the point of use while occupying a small volume and at costs which greatly improve its competitive position in the market place.

The floral basket 20 shown in the drawings broadly comprises a handle 21, box frame 22 and receptacle 23.

The handle 21 consists of spanning member 24 respectively secured adjacent its ends in pivotal relation to risers 25 and 26 by pivot means such as nails 27, 28 or the like. Risers 25 and 26 are disposed on opposite sides of spanning member 24 which cooperates with pivot nails 27, 28 to secure said pivots in parallel relation. The handle 21 may be decorated as desired, but if wrapped with a cording 29 in the manner illustrated in FIGS. 1, 2 and 7 the cording serves to conceal the pivot nails 27, 28 and offers no material interference to the folding of the handle 21 into the condition illustrated in FIG. 7 in the manner subsequently described herein.

Duplicate box ends 30 and 31 are secured by fastener means 32, such as nails, staples or the like, to the lower portions of respective risers 25 and 26 in adjacent, generally opposed facing relation, as shown in FIG. 1. Box ends 30, 31 are disposed between and extend transversely of the risers 25 and 26 which as shown in FIG. 1 support box ends 30 and 31 in downwardly converging relation with their lower edges 33 and 34 parallel.

In FIG. 4, box end 30, a duplicate of box end 31, is shown as a trapezoidal member formed from a suitable material such as plywood, pressedboard, plastic, which materials are mentioned for illustrative and not for limitive purposes. A pair of notches or slots 35, 36 extend in downwardly converging relation from upper edge 37 of box end 30 to spaced blind ends 38, 39. Slots 35, 36 are of a width $w$, substantially equal to the thickness $x$ of box sides 40, 41, which results in a close or snug fit between the box end 30 and the portion of a box side received therein as subsequently described herein.

In FIG. 5, box side 40, a duplicate of box side 41, is shown as a trapezoidal member of suitable material, similar to box ends 30, 31. A pair of notches or slots 42, 43, similar to slots 35, 36 extend in upwardly diverging relation from lower edge 44 of box side 40 to blind ends 46, 47. Slots 42, 43 are of a width $y$, substantially equal to the thickness $z$ of box ends 30, 31, which results in a close or snug fit between the respective box side 40 or 41 and the portion of a box end 30 or 31 received therein as subsequently described herein. Box ends 30 and 31 are coupled by handle 21, which biases them toward respective canted positions in which they do not align exactly with notches or slots 42, 43 in box side 40 as it is forcefully advanced from the position in which it is shown in full lines in FIG. 6 into the assembled position in which its lower edge 44 is in the limit position indicated by dot-dash line 44a in FIG. 6, substantially coplanar with lower edges 33 and 34 of box ends 30, 31. The latter limit position is preferably determined, either by cooperation of the lower edges 33, 34, 44, 45, with a supporting surface or by paired cooperation of the ends of slots 35, 42 and 36, 43 or both.

Box side 41 is placed in similar lowered limit position relation to box ends 30, 31. The resiliency of handle 21, together with the snug fit of portions of box ends 30, 31 received in box side slot-notches 42, 43 and portions of box sides 40, 41 received in box end slot-notches 35, 36 result in interlocking of the box ends and sides in firm relation to form an upwardly flaring semi-rigid box-frame with handle.

Receptacle 23 is then placed in cooperation with the handle-box-forming members. Receptacle 23 has a wedge-shaped exterior which converges downwardly as shown and may be a frusto-conic papier-mache bucket of substantially rigid character and preferably of the water proof type. The receptacle 23 has a minimum external diameter illustrated by circle 48 in FIG. 3. The minimum external diameter is greater than the minimum spacing of box sides 40, 44, but less than the maximum spacing thereof. As is also illustrated by circle 48 in FIG. 3, the minimum external diameter of receptacle 23 is also preferably greater than the minimum spacing of box ends 30, 31, but less than the maximum spacing thereof. Receptacle 23 is advanced wedgingly downwardly within the assembled box frame, that is between box sides 40, 41 and box ends 30, 31 until the small, closed end 23b thereof reaches, but does not penetrate the plane of edges 33, 34, 44, 45. Such downward advancement of receptacle 23 bows or bulges box sides 40, 41 and box ends 30, 31 outwardly as illustratively indicated by dashed lines 50 in FIG. 3, and also results in application of pressure by the central portions of members 30, 31, 40, 41 to the contacted areas of the exterior surface of receptacle 23, which contacted areas in the illustrative example have substantial width, due to forceful cooperation of the box frame with receptacle 23, and extend substantially from the respective upper edges 37, 52, 53, 54 to the respective lower edges 33, 34, 44, 45 of box ends 30, 31 and box sides 40, 41, that is from circle 49 to circle 48 in FIG. 3. The contact established over these areas serves to secure receptacle 23 against unintentional dislodgement from its cooperative relation wih other parts of the floral basket 20.

The assembled floral basket 20 is thus a rigid structure, the parts of which cooperate in interstressing condition when assembled for use.

The floral basket 20 may be disassembled and readied for storage or shipment by removing receptacle 23 and box sides 40, 41, folding handle 21 with box ends attached, and securing box sides 40, 41 in flatwise relation to box end 31 or 30 by a rubber band 55 or other suitable binding means to place handle 21 with box ends and sides in the condition shown in FIG. 7. Receptacles 23 may be nested as shown in FIG. 8 and handles 21, with box ends and sides attached as described and shown in FIG. 7, may be easily stacked in a container, together with a corresponding member of nested receptacles 23, so that many floral baskets 20 may be shipped and stored in a comparatively small space and assembled without tools into rigid baskets in little time when desired for use.

Having thus described what presently appears to be a preferred embodiment of my invention, it will be apparent to those having ordinary skill in the art to which this invention pertains that various modifications and changes may be made in the illustrative embodiment, without departing from the spirit or scope of the appended claims.

What I claim and desire to secure by Letters Patent is:

1. A floral basket comprising in combination a handle, a pair of box ends attached to said handle which connects said ends and limits unstressed positioning of one of said ends relative to the other of said ends, a pair of box sides each cooperatively engaging each of said ends to form a frame, said box sides supporting cooperating portions of said box ends in a predetermined relation to each other differing from the relation in which said connecting handle tends to bias them and with the box ends and handle forming a stressed handle-frame assembly, and a wedging receptacle wedgingly cooperating with said frame and bowing the ends and sides of said frame outwardly, whereby said handle-frame and receptacle comprise a floral basket stressed to remain in rigid assembled relation.

2. A floral basket comprising in combination a handle, a pair of box ends attached to said handle, said handle biasingly connecting said ends and limiting unstressed positioning of one of said ends relative to the other of said ends, a plurality of box sides cooperatively supporting and connecting said ends to form a frame, said box sides supporting cooperating portions of said box ends in a predetermined relation to each other differing from the relation in which said connecting handle tends to bias said ends and with the box ends and handle forming a stressed handle-frame assembly, and a wedging receptacle wedgingly cooperating with said frame and bowing the ends and sides of said frame outwardly, whereby said handle, frame and receptacle comprise a floral basket stressed to remain in rigid assembled relation.

3. A floral basket comprising in combination an articulated handle, a pair of box ends attached to said handle, said handle biasingly connecting said ends and limiting unstressed positioning of one of said ends relative to the other of said ends, a plurality of box sides cooperatively connecting said box ends and therewith forming a frame, said box sides supporting cooperating portions of said box ends in a predetermined relation to each other differing from the relation in which said connecting handle tends to bias them and with the box ends and handle forming a stressed handle frame assembly, and a wedging receptacle wedgingly cooperating with said frame and bowing the ends and sides of said frame outwardly, whereby said handle, frame and receptacle comprise a floral basket stressed to remain in rigid assembled relation.

4. A handled-frame for a floral basket comprising in combination a central handle portion, two handle riser portions each pivotally secured to the central handle portion adjacent a respective end thereof, a pair of frame ends each rigidly secured to a respective handle riser portion in the general plane of said handle riser portion adjacent a free end thereof and swingable therewith, and a pair of frame sides each having a pair of spaced frame end receiving notches, each of which notches is substantially the same width as the thickness of the respective frame end, said frame sides cooperatively receiving portions of said frame ends which frame ends are engaged and connected to form a handled-frame, the vertical angle between the notches of each frame side being different from the vertical angle between the frame ends at the time of initial engagement of the notches with their respective frame ends, whereby a handled-frame stressed to remain in rigid assembled condition may be provided.

5. A floral basket comprising in combination a central handle portion, two handle riser portions each pivotally secured to the central handle portion adjacent a respective end thereof, a pair of frame ends each attached securely to a respective handle riser portion in the general plane of said handle riser portions adjacent a free end of said riser and swingable therewith, a pair of frame sides each notched to cooperatively engagingly receive and spacingly connect said frame ends, each of said notches being substantially the same width as the thickness of the frame end, said frame sides cooperatively receiving portions of said frame ends in said notches and engaging and connecting said frame ends to form a handled-frame, the vertical inclination of each notch relative to the portion of the frame end received by it being different from the vertical inclination in which the handle portions support said portions of the frame ends at the time of the initial engagement of the latter in the notches of the frame sides which support cooperating portions of said frame ends in predetermined relation to each other differing from the relation in which said connecting handle tends to support the frame ends and thereby stress the frame ends and handle portions in relation thereto, and a receptacle wedged in frictional engagement in cooperating carriable relation to said handled-frame, whereby said handle frame and receptacle cooperate to form a rigid floral basket.

6. A shippable floral basket comprising in combination a central handle portion, two handle riser portions each pivotally secured to the central handle portion adjacent a respective end thereof, a pair of frame ends each attached securely to a respective handle riser portion in the general plane of said handle riser portions adjacent a free end thereof and swingable therewith, a pair of frame sides each notched to cooperatively and supportingly engage and spacingly connect said frame ends, each of said notches being substantially the same width as the thickness of the frame end, said frame sides cooperatively receiving portions of said frame ends in said notches, which frame ends are engaged and connected to form a handled-frame, said frame sides supporting cooperating portions of said frame ends in predetermined relation to each other differing from the relation in which said connecting handle tends to support the frame ends when the latter are not in cooperating relation to said frame sides and thereby stressing the frame ends and handle portions in relation thereto, and a wedging receptacle wedgingly cooperating with said frame and convexly bowing outwardly the ends and sides thereof to further stress and securely lock said frame sides and ends in cooperating frame forming relation while securely embracing said receptacle, whereby said handle-frame and receptacle may be shipped in compact relation and assembled to cooperate to form a rigid floral basket stressed to remain in assembled relation.

7. A floral basket comprising in combination a central handle portion, two handle riser portions each pivotally secured to the central handle portion adjacent a respective end thereof, a pair of frame ends each having a pair of frame side receiving notches and each being rigidly secured to a respective handle riser portion in the general plane of said handle riser portions adjacent a free end of said riser and swingable therewith, a pair of frame sides each having a pair of frame end receiving notches cooperatively engaging and spacingly connecting said frame ends, each of said notches being substantially the same width as the thickness of the frame end, said frame sides cooperatively receiving portions of said frame ends which frame ends are engaged and connected to form a handled-frame, the vertical angle between the notches of each frame side being different from the vertical angle between the frame ends at the time of initial engagement of the notches with their respective frame ends, and a wedging receptacle wedgingly cooperating with said frame and convexly bowing outwardly the ends and sides thereof to further stress and securely lock said frame sides and ends in cooperating frame forming relation while securely embracing said receptacle, whereby said handle frame and receptacle cooperate to form a floral basket stressed to remain in rigid assembled condition.

8. A floral basket comprising in combination a central handle portion, two handle riser portions each secured to the central handle portion adjacent a respective end thereof for pivoting about respective parallel axes, a pair of frame ends each having a pair of spaced frame side receiving notches and each being secured to a respective handle riser portion in the general plane of said handle riser portions adjacent a free end thereof and swingable therewith and not swingable annularly thereabout, a pair of frame sides each having a pair of spaced frame end receiving notches cooperatively receiving therein portions of said frame ends and engaging and connecting said frame ends, each of said notches being substantially the same width as the thickness of the frame end, said frame sides cooperatively receiving portions of said frame ends which frame ends are engaged and connected to form a handled-downwardly-narrowing-frame, the vertical angle between the notches of each frame side being different from the vertical angle between the frame ends at the time of initial engagement of the notches with their respective frame ends, and a wedging receptacle downwardly narrowing with a taper-angle corresponding to the downwardly narrowing of the frame and wedgingly cooperating with said frame and convexly bowing outwardly the ends and sides thereof to further stress and securely lock said frame sides and ends in cooperating frame forming relation while securely embracing said receptacle, whereby said handle frame and receptacle cooperate to form a rigid stressed floral basket.

9. A floral basket comprising in combination a central handle portion, two handle riser portions each pivotally secured to the central handle portion adjacent a respective end thereof for pivoting about respective parallel axes of said risers into substantially parallel relation to said central handle portion, a pair of frame ends each secured to a respective handle riser portion adjacent a free end thereof and swingable therewith into positions in which they are related by the connecting handle riser and central portions and to establish the folded relation of the handle as a limit of riser swing, a pair of frame sides, each having a pair of spaced frame end receiving notches cooperatively receiving and connecting said frame ends and supporting same in a relation to each other differing from the relation in which said connecting handle tends to bias them when said frame sides are not in cooperative relation thereto and thereby stressing said frame ends and handle to form a handled-downwardly-narrowing-frame in cooperating relation thereto, and a wedging receptacle downwardly-narrowing with a taper-angle corresponding to the downwardly narrowing of the frame and wedgingly cooperating with said frame and convexly bowing outwardly the ends and sides thereof to further stress and securely lock said frame sides and ends in cooperating frame forming relation while securely embracing said receptacle, whereby said handle frame and receptacle cooperate to form a rigid stressed floral basket.

10. A handled-floral-basket-frame comprising in combination a pair of box ends, a handle connecting and supporting said box ends so that the positioning of one box end relative to the other box end is limited by said handle, and a pair of box sides each cooperatively engaging each of said ends and supporting one said box end in relation to the other said box end which differs from the relation thereto in which said connecting handle alone tends to support them and thereby stressing said box ends and handle and forming therewith a frame stressed by oppositely biasing forces applied to said box ends by said handle and said box sides, whereby said handle and frame comprise a handled-floral-basket-frame stressed to rigid condition.

References Cited by the Examiner
UNITED STATES PATENTS

| | | |
|---|---|---|
| 1,472,461 | 10/1923 | Comstock. |
| 2,951,642 | 3/1934 | Augustin et al. |
| 2,524,671 | 10/1950 | Lampe _____ 248—48 |
| 2,580,671 | 1/1952 | Goyette. |
| 2,682,971 | 7/1954 | Gruenholz _____ 220—94 X |

FOREIGN PATENTS

| | | |
|---|---|---|
| 162,079 | 1/1949 | Austria. |

ABRAHAM G. STONE, *Primary Examiner.*

T. GRAHAM CRAVER, ARNOLD RUEGG, ANTONIO F. GUIDA, *Examiners.*